May 6, 1952  L. M. LYONS  2,595,684
CULINARY UTENSIL
Filed Nov. 17, 1949

INVENTOR.
LUCY M. LYONS
BY *Herbert A. Smith*
Attorney

Patented May 6, 1952

2,595,684

UNITED STATES PATENT OFFICE 2,595,684

CULINARY UTENSIL

Lucy M. Lyons, Newark, N. J.

Application November 17, 1949, Serial No. 127,819

2 Claims. (Cl. 99—433)

This invention pertains to a culinary utensil and more particularly to an improved utensil for the making of pastry shells or crusts that may be used as pie shells or patty shells which are adapted to be filled with an edible substance.

It is a primary object of the invention to provide an improved culinary utensil for making pie shells, crusts, and the like wherein a conventional base container may be employed in conjunction with the present invention for the purpose of placing uncooked material on the base member and thereafter positioning the present improved culinary utensil to rest against the upper surface of the uncooked material to retain same in a predetermined position so that during the cooking or baking of the pastry material the pastry shell will not buckle, bend, become distorted or otherwise irregular.

A further object of the invention is to provide a culinary utensil having a novel wire frame structure which may be easily fabricated, and readily assembled.

A further object of the invention is to provide a device of the class set forth wherein a substantially rigid wire frame is made in sections in such a manner that it may be readily assembled so that all parts will be fitted together properly to receive a wire mesh on said frame, which mesh will have an underneath surface having a contour substantially identical with the contour of the desired upper surface of the pastry material to be baked or cooked.

A further object of the invention is to provide a novel culinary utensil which has two complemental sections disposed to receive a rib member which is circular in form and to include substantially rigid members which form a bottom frame work therefore, all of which is assembled and adapted to receive a wire mesh on the underneath portion thereof.

A further object of the invention is to provide a wire mesh covered supporting frame with means for spacing said frame and holding same in position in relation to a conventional type base container so that the invention may be positioned in relation to the base container and retained in said position throughout the baking or cooking process of the pastry material.

Further objects of the invention may be and may become apparent to one skilled in the art from a perusal of the presentation herewith. It is to be understood that the present disclosure is of a preferred embodiment and is not to be considered a limitation except as defined by the scope of the subjoined claims.

Figure 1:
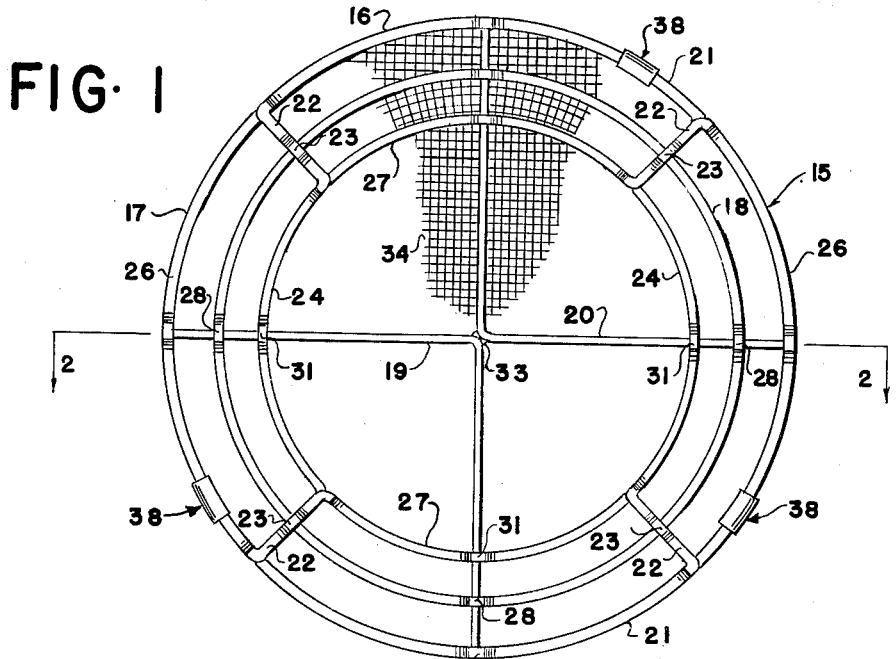
Fig. 1 is a plan view of the culinary utensil of the invention showing a portion of the wire mesh positioned on the bottom part thereof, said mesh material not being shown on the remainder of the bottom of the frame for the sake of clarity.
Figure 2:
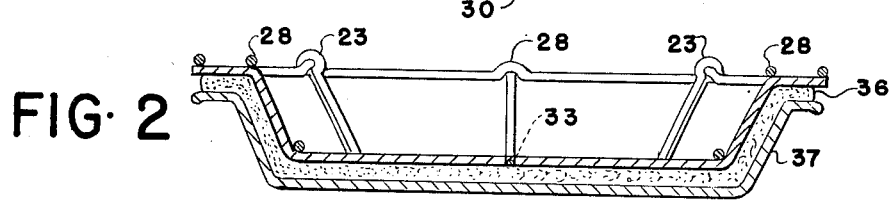
Fig. 2 is a sectional view taken substantially along lines 2—2 of Fig. 1 in relation to a conventional pie plate with the pastry material disposed therebetween and the wire mesh being omitted in conformance with the sectional cutting line of Fig. 1.
Figure 3:
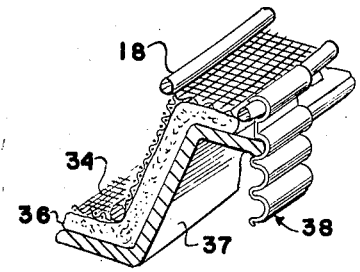
Fig. 3 is a partial sectional view of the invention positioned upon the pie plate with the pastry material being disposed therebetween and a positioning clasp urging the mesh of the utensil against the upper surface of the pie shell.

Referring to the drawings, there is shown the culinary utensil of the invention 15 having a metallic frame consisting of a primary section 16, a secondary section 17, which is identical with said primary section, a circular rib 18 which overlies both the primary and secondary sections 16 and 17, respectively, and two angular ribs, 19 and 20, which are identical.

Each of the primary and secondary sections are identical in structure to permit the sections to fit each other and be aligned with the circular rib 18, and the angular ribs 19 and 20.

The primary section has a pair of oppositely disposed rim portions 21, each of which leads into two strap portions 22, with each of said opposing strap portions comprising at least a horizontal portion and an inclined portion, with the lower ends of the inclined portions each engaging one of the opposing ends of a base portion 24. Two of the diametrically opposed straps 22 of primary section 16 have half loops 23 with the remaining two straps 22 of primary section 16 having only the inclined and horizontal portions which is indicated as strap 25. Straps 22 and straps 25 differ in that straps 25 do not have a half loop, such as 23 which is formed in the straps 22.

Figure 4:
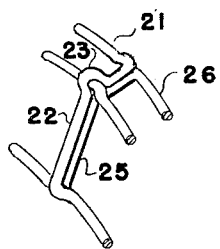
Fig. 4 is a partial view of two sections of the wire form being fitted together in relation to the circular wire member.
Figure 5:
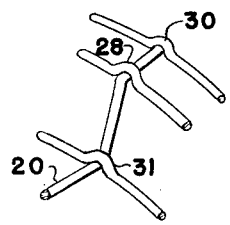
Fig. 5 is a partial view showing one form of the angular rib of the frame in relation to the remaining portions of the frame which is engaged by the particular portion of the angular rib shown.

The secondary section 17 is identical with the primary section 16. When the two sections 16 and 17 are formed and secured together they are complemental, and complete the rim and base portions of the invention. The two strap portions 25 of each of the primary and secondary sections are disposed below the two strap portions 22 of each of the primary and secondary sections, as shown in Fig. 4, bends in the rims 21 and 26, and the base portions 27 and 24, in the area of the straps such as 22, causes all of the four rim portions to lie substantially in the same plane but at a level lower than said rims.

The circular rib 18 is a closed metallic rod which has four raised half loops 28 equidistantly spaced to overlie the adjacent free ends of each of the angular ribs 19 and 20. The extreme free ends of ribs 19 and 20 engage the underneath surface of the half loops 30, there being one half loop 30 formed in each of the primary and secondary rim portions 16 and 17 respectively.

Each of the primary and secondary base portions 27 and 24 have a half loop 31 formed therein to overlie the angular ribs 19 and 20.

The angular ribs 19 and 20 are welded together at point 33, and the half loops are welded to the angular ribs and the circular rib.

The wire mesh 34 is secured to the underneath area of the entire utensil framework and is tightly drawn so that the edible pastry material 36, such as a pie crust will be regular in shape consistant with the outline of the mesh wire drawn over the wire form structure.

A conventional pie plate or lower form container 37 may be used with the present invention as shown. In order to retain the utensil of the invention in a predetermined position during the baking or cooking operation, a plurality of positioning clasps 38 are secured to the rim portions of the utensil, and have formed thereon a multiplicity of channels, any one of which may be used to engage the peripheral edge of the bottom container. However, when the similar channels of all the positioning clasps engage the pie plate, the pastry material will be held securely by the utensil throughout the baking operation.

From the foregoing description it will be seen that the invention fulfills the object set forth heretofore.

Any suitable material may be used for the framework structure but it is pointed out that the round rod is a preferred embodiment of frame material. The mesh screen may be of any particular material but in its preferred form it is suggested that metallic material be employed.

What is claimed as new and desired to be secured by Letters Patent of the United States is:

1. A culinary utensil having a base portion formed of material having an uninterrupted surface of predetermined contour, a complemental upper portion having an interrupted lower surface of predetermined contour similar to said uninterrupted upper surface of said base portion and adapted to be securely disposed spatially therefrom, said complemental upper portion comprising a primary section and a secondary section each having a pair of rim portions, a pair of base portions, and strap portions connecting said rim portions to said base portions, a circular rib disposed adjacent the various strap portions of the primary and secondary sections, a pair of angular ribs connected to each other and to the primary and secondary sections and the circular rib, said sections being complemental to each other and forming a framework, a mesh material being stretched and secured to one side of the framework of the utensil forming said interrupted lower surface of predetermined contour, and a multiplicity of positioning clasps having channels formed therein and being secured to certain of said rim portions and being adaptable for engaging one channel of each of said clasps with the peripheral edge of said base section.

2. A culinary utensil having a base portion formed of material having an uninterrupted upper surface of predetermined contour, a complemental upper portion having an interrupted lower surface of predetermined contour similar to said uninterrupted upper surface of said base portion and adapted to be securely disposed spatially therefrom, said complemental upper portion comprising a primary section and a secondary section each having a pair of rim portions, a pair of base portions, and strap portions connecting said rim portions to said base portions, a circular rib disposed adjacent the various strap portions of the primary and secondary sections, a pair of angular ribs connected to each other and to the primary and secondary sections and the circular rib, said sections being complemental to each other and forming a framework, a mesh material being stretched and secured to one side of the framework of the utensil, and a multiplicity of resilient positioning clasps having channels formed therein and being connected to certain of said rim portions and being adaptable for engaging one channel of each of said clasps with the peripheral edge of said base portion.

LUCY M. LYONS.

REFERENCES CITED

The following references are of record in the file of this patent:

UNITED STATES PATENTS

| Number | Name | Date |
|---|---|---|
| 863,776 | Bliemeister | Aug. 20, 1907 |
| 892,020 | Walburn | June 30, 1908 |
| 1,182,901 | Gillespie | May 16, 1916 |
| 1,411,128 | Strobhart | Mar. 28, 1922 |
| 1,596,331 | Bassett | Aug. 17, 1926 |
| 1,688,846 | Andrews | Oct. 23, 1928 |
| 1,938,572 | Agey | Dec. 17, 1933 |
| 2,086,475 | Powell | July 6, 1937 |
| 2,167,038 | Damon | July 25, 1939 |
| 2,506,928 | Klingbiel | May 9, 1950 |

FOREIGN PATENTS

| Number | Country | Date |
|---|---|---|
| 113,165 | Switzerland | Dec. 16, 1925 |
| 303,843 | Great Britain | Jan. 10, 1929 |
| 804,296 | France | Oct. 20, 1936 |